(12) United States Patent
Kar et al.

(10) Patent No.: US 11,485,920 B2
(45) Date of Patent: *Nov. 1, 2022

(54) ULTRA LOW SULFUR MARINE FUEL COMPOSITIONS

(71) Applicant: ExxonMobil Technology and Engineering Company, Annandale, NJ (US)

(72) Inventors: Kenneth C. H. Kar, Yardley, PA (US); Sheryl B. Rubin-Pitel, Newtown, PA (US); Shifang Luo, Annandale, NJ (US); Randolph J. Smiley, Hellertown, PA (US); Lisa M. Guay, Morristown, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,889

(22) Filed: May 20, 2021

(65) Prior Publication Data

US 2021/0363444 A1 Nov. 25, 2021

Related U.S. Application Data

(60) Provisional application No. 63/028,704, filed on May 22, 2020.

(51) Int. Cl.
*C10L 1/02* (2006.01)
*C10G 67/02* (2006.01)

(52) U.S. Cl.
CPC ............... *C10L 1/02* (2013.01); *C10G 67/02* (2013.01); *C10G 2300/1014* (2013.01);
(Continued)

(58) Field of Classification Search
CPC ............... C10L 1/02; C10L 2200/0476; C10L 2200/0484; C10L 2290/24; C10G 67/02;
(Continued)

(56) References Cited

U.S. PATENT DOCUMENTS

| 4,801,373 A | 3/1989 | Corman et al. |
| 8,987,537 B1 | 3/2015 | Droubi et al. |

(Continued)

FOREIGN PATENT DOCUMENTS

| CN | 101220286 A | 7/2008 |
| JP | 6270546 B2 | 1/2018 |

OTHER PUBLICATIONS

Ohmes et al., "Impact of Light Tight Oils on Distillate Hydrotreater Operation", Petroleum Technology Quarterly, May 2016, pp. 25-33.
(Continued)

*Primary Examiner* — Ellen M McAvoy
(74) *Attorney, Agent, or Firm* — Shook Hardy & Bacon L.L.P.

(57) ABSTRACT

Hydroprocessed residual fuel and/or fuel blending components are provided that have a sulfur and nitrogen level comparable to liquefied natural gas (LNG). Because of the low starting level of sulfur and/or nitrogen, the severity of the hydroprocessing that is needed for the crude oil or bottoms fraction in order to remove sulfur to a level that is comparable to LNG is reduced or minimized. This can allow the resulting marine residual fuels to have low carbon intensity, low SOx and NOx emission and high energy density. Since the hydroprocessed fractions correspond to a fuel oil product, the resulting marine fuel can be used in existing fleets, and can be distributed in existing bunkering systems.

25 Claims, 4 Drawing Sheets

(52) U.S. Cl.
CPC ............... *C10G 2300/1074* (2013.01); *C10G 2300/1077* (2013.01); *C10G 2300/202* (2013.01); *C10G 2300/302* (2013.01); *C10G 2300/304* (2013.01); *C10G 2300/308* (2013.01); *C10L 2200/0476* (2013.01); *C10L 2200/0484* (2013.01); *C10L 2290/24* (2013.01)

(58) Field of Classification Search
CPC .... C10G 2300/1014; C10G 2300/1074; C10G 2300/1077; C10G 2300/202; C10G 2300/302; C10G 2300/304; C10G 2300/308
See application file for complete search history.

(56) References Cited

U.S. PATENT DOCUMENTS

| | | | |
|---|---|---|---|
| 8,999,011 B2 | 4/2015 | Stern et al. | |
| 9,920,270 B2 | 3/2018 | Robinson et al. | |
| 10,047,299 B2 | 8/2018 | Rubin-Pitel et al. | |
| 10,316,263 B2 | 6/2019 | Rubin-Pitel et al. | |
| 10,443,006 B1* | 10/2019 | Fruchey | C10L 1/08 |
| 10,597,594 B1* | 3/2020 | Fruchey | C10L 1/04 |
| 10,781,391 B2* | 9/2020 | Fruchey | C10L 1/08 |
| 10,899,983 B1* | 1/2021 | Kar | C10G 31/06 |
| 11,236,281 B2* | 2/2022 | Rogel | C10G 75/04 |
| 2012/0137572 A1 | 6/2012 | Bartek et al. | |
| 2012/0246999 A1 | 10/2012 | Stern et al. | |
| 2015/0353851 A1* | 12/2015 | Buchanan | C10L 10/02 208/15 |
| 2017/0183575 A1 | 6/2017 | Rubin-Pitel et al. | |
| 2017/0211005 A1* | 7/2017 | Yeh | C10G 67/0463 |
| 2018/0155646 A1 | 6/2018 | Sasaki et al. | |
| 2018/0371343 A1 | 12/2018 | Rubin-Pitel et al. | |
| 2019/0185772 A1 | 6/2019 | Berkhous et al. | |
| 2020/0385644 A1* | 12/2020 | Rogel | C10G 75/00 |
| 2021/0062100 A1* | 3/2021 | Milam | C10G 67/16 |

OTHER PUBLICATIONS

International Search Report and Written Opinion PCT/US2021/033559 dated Aug. 30, 2021.

* cited by examiner

|  | ISO 8217 RMD 80 VLSFO Limit | Feed | Product | LNG | Comparative Example: Hydrotreated vacuum resid in US2016/0160139 | Comparative Example: Bottoms of HDT Catalytic Slurry Oil in US10047299 |
|---|---|---|---|---|---|---|
| Saturates (wt%) |  | 75.07 | 86.3 | 100 | - | 29.2 |
| 1-ring aromatic ring class (wt%) |  | 11.67 | 9.1 | 0 | - | 17.3 |
| Aromatics (wt%) |  | 24.56 | 13.6 | 0 | - | 67.7 |
| Sulfides (wt%) |  | 0 | 0.0 | 0 | - | 1.8 |
| Polars (wt%) |  | 0.37 | 0.0 | 0 | - | 14 |
|  |  |  |  |  |  |  |
| Density at 15°C (kg/m3) | Max. 975 | 869.5 | 834.5 | 421-467 | 945 | 1005 |
| KV100 (cSt) |  | 9.4494 | 4.1355 | NA | - | - |
| KV 70 (cSt) |  | 21.437 | 7.6093 | NA | - | - |
| KV50 (cSt) | Max. 80.00 | 44.6 | 13.0 | NA | 442 | 920.9 |
| VI |  | 114 | 137 | NA |  |  |
| Sulfur (wt%) | Max. 0.50 | 0.0312 | <0.0005 | <0.0005 | 0.1280 | 0.0219 |
| Nitrogen (ppm m/m) |  | 167 | 2 | ~1 | 1600-2300 | 104.7 |
| CCAI | Max. 860 | 758 | 745 | NA | 808 | 858 |
| Energy content (MJ/kg) |  | 42.7 | 43.2 | ~45 | 41.7 | 40.9 |
| BMCI |  | 21.5 | 9.3 | - | 54.5 | 89.7 |
|  |  |  |  |  |  |  |
| IBP (°C) |  | 355.9 | 346.9 | ~ -162 | 305 | 352.2 |
| T10 (°C) |  | 396.3 | 376.2 |  | 389.6 | 374.1 |
| T50 (°C) |  | 463.1 | 417.6 |  | 496 | 422.0 |
| T90 (°C) |  | 573.3 | 477.7 |  | 726.4 | 526.8 |
| FBP (°C) |  | 634.0 | 547.5 |  | 750+ | 640.3 |

FIG. 3

|  | Conv RSFO* | Feed | Product 1 | Product 2 | LNG |
|---|---|---|---|---|---|
| Density at 15°C (kg/m3) | 985 | 912.4 | - | - | 421-467 |
| KV100 (cSt) | - | 31.467 | - | - | NA |
| KV 70 (cSt) | - | 102.03 | - | - | NA |
| KV50 (cSt) | 344.5 | 297 | - | - | NA |
| VI |  | 82 |  |  | NA |
| Sulfur (wt%) | 2.51 | 0.197 | 0.0100 | 0.00898 | <0.0005 |
| Nitrogen (ppm m/m) | ~10000 | 2258 |  |  | ~1 |
| CCAI | 847 | 776 | - | - | NA |
| BMCI | 71.8 | 36.6 | - | - | - |
| N-Heptane Insolubles (wt%) | ~6 | - | - | - | - |
| MCR (wt%) | 13.57 | - | - | - | - |
| Sulfur dioxide emission from fuel (kg/kg of fuel) | 0.050 | 0.0039 | 0.00020 | 0.00018 | 0.000005 |
| Sulfur dioxide emission from Lubricant (kg/kg of fuel) | 0.0025 | 0.0025 | 0.0025 | 0.0025 | 0.0025 |
| Total sulfur dioxide emission (kg/kg of fuel) | 0.053 | 0.0064 | 0.0027 | 0.0027 | 0.0025 |
| Sulfur dioxide emission reduction relative to RSFO (%) | 0 | 88 | 95 | 95 | 95 |
|  |  |  |  |  |  |
| IBP (°C) | varies | 406.6 | 419.0 | 452.0 | ~ -162 |
| T10 (°C) | varies | 459.7 | 461.0 | 488.3 | - |
| T50 (°C) | varies | 527.1 | 509.0 | 538.8 | - |
| T90 (°C) | varies | 617.4 | 579.7 | 615.5 | - |
| FBP (°C) | varies | 647.3 | 643.5 | 661.3 | - |

FIG. 4

ULTRA LOW SULFUR MARINE FUEL COMPOSITIONS

CROSS-REFERENCE TO RELATED APPLICATIONS

This application claims the benefit of U.S. Provisional Application No. 63/028,704, filed on May 22, 2020, the entire contents of which are incorporated herein by reference.

FIELD

This disclosure relates to high saturates content, low sulfur content, and low nitrogen content marine fuel compositions or fuel blending compositions and methods for forming such fuel compositions or fuel blending compositions.

BACKGROUND

Ocean transport vessels that burn marine fuel oil have historically represented a significant source of $CO_2$ emissions, as well as being a source of emissions of SOx and NOx. In an effort to reduce carbon emissions, the International Maritime Organization (IMO) has agreed on a target to cut the shipping sectors' overall $CO_2$ output by 50% by 2050 compared to 2008. In an effort to meet this ambitious goal, one option that has been identified is to convert marine engines to use liquefied natural gas (LNG) as a fuel. Due to high hydrogen to carbon ratio, LNG has the lowest tank-to-propeller carbon emission compared to other hydrocarbon fuels. For example, compared to conventional diesel fuel, $CO_2$ emissions can be 20% to 25% lower. If the well-to-tank emissions are also considered in order to account for the full life cycle of the respective fuels, the carbon intensity for LNG is still 10% to 15% lower than conventional diesel fuel. LNG also has a low content of sulfur and nitrogen compounds. Therefore, an LNG diesel cycle marine engine emits 95% lower SOx emission and 20% less NOx emission.

However, LNG has several drawbacks. First, LNG is a cryogenic liquid. Cryogenic liquids present significantly greater difficulties with regard to transport and handling relative to a conventional residual fuel oil or diesel fuel. Additionally, LNG cannot be transported using existing marine fuel distribution systems, so an entirely new LNG bunkering infrastructure would need to be developed. This limits the availability of LNG globally. Still another issue is that in a storage tank, some LNG will boil off due to heat ingress. Such boil off needs to be managed during storage or refilling, or it will be emitted to the atmosphere directly. Methane, a primary component of LNG, is a known greenhouse gas. As a result, any direct emission of methane due to boil off can partially (or possibly completely) negate the reduced $CO_2$ emissions benefit of the fuel. Yet another issue is that LNG can only be used in engines designed to burn gaseous fuel, and similarly the storage tanks and fuel systems on a vessel would need to be replaced to handle LNG. Due to this wide array of difficulties, LNG is typically only used on newly constructed vessels.

Based on the above, it would be desirable to develop marine fuels that can provide some or all of the emissions benefits of LNG while reducing or minimizing the need to build new infrastructure to use the marine fuels. It would further be desirable for the marine fuels to reduce or minimize the amount of retrofitting or replacement of engines and fuel systems on marine vessels in order to make use of the fuel.

An article titled "Impact of Light Tight Oils on Distillate Hydrotreater Operation" in the May 2016 issue of Petroleum Technology Quarterly describes hydroprocessing of kerosene and diesel boiling range fractions derived from tight oils.

U.S. Patent Application Publication 2017/0183575 describes fuel compositions to formed during hydroprocessing of deasphalted oils for lubricant production.

U.S. Pat. No. 9,920,270 describes fuel compositions made by hydroprocessing of vacuum resid.

U.S. Pat. No. 8,999,011 describes heavy distillate fractions that can be used in fuel compositions such as fuel oils.

U.S. Pat. No. 10,047,299 describes various compositions derived from hydroprocessing of main column bottoms from a fluid catalytic cracking process.

SUMMARY

In an aspect, a fuel or fuel blending component is provided. The fuel or fuel blending component includes a kinematic viscosity at 50° C. of 5.0 cSt to 100 cSt, a sulfur content of 150 wppm or less, a density at 15° C. of 800 $kg/m^3$ to 900 $kg/m^3$, and an aromatics content of 5.0 wt % to 25 wt %. In some aspects, the fuel or fuel blending component can include a sulfur content of 50 wppm to 150 wppm and/or a nitrogen content of 100 wppm or less. In some aspects, the fuel or fuel blending component can include sulfur content of 5.0 wppm or less and/or a nitrogen content of 5.0 wppm or less. Optionally, the viscosity index can be 120 or more. Optionally, the fuel or fuel blending component can be blended with another fraction, such as a renewable fraction.

In another aspect, a fuel or fuel blending component is provided. The fuel or fuel blending component includes a density of 930 $kg/m^3$ or less, a kinematic viscosity at 50° C. of 100 or more, a sulfur content of 50 wppm to 150 wppm, a BMCI of 50 or less, and a CCA1 of 800 or less. Optionally, the nitrogen content can be 100 wppm or less and/or the viscosity index can be 80 or more. In some aspects, the fuel or fuel blending component can include a T10 distillation point of 400° C. or more and/or a T90 distillation point of 550° C. or more. Optionally, the fuel or fuel blending component can be blended with another fraction, such as a renewable fraction.

In still other aspects, a method for forming a fuel or fuel blending component is provided. The method includes fractionating a crude oil to form at least a resid-containing fraction, the crude oil having a final boiling point of 550° C. or more, a naphthenes to aromatics volume ratio of 3.0 or more and a sulfur content of 0.2 wt % or less. Additionally, the method includes hydrotreating the resid-containing fraction to form a hydrotreated resid-containing fraction including the fuel or fuel blending component.

DETAILED DESCRIPTION

In various aspects, it has been unexpectedly found that some crude oils/fractions of crude oils from shale petroleum sources are uniquely suited to manufacturing of an ultra clean residual marine fuel. Due in part to a low level of sulfur, nitrogen, carbon residue and other contaminants, such selected crudes and bottoms can be hydroprocessed to remove sulfur and nitrogen to a level comparable to liquefied natural gas (LNG). Because of the low starting level of sulfur and/or nitrogen, the severity of the hydroprocessing that is needed for the crude oil or bottoms fraction in order to remove sulfur to a level that is comparable to LNG is reduced or minimized. This can allow the resulting marine residual fuels to have low carbon intensity, low SOx and NOx emission and high energy density. Since the hydroprocessed fractions correspond to a fuel oil product, the resulting marine fuel can be used in existing fleets, and can be distributed in existing bunkering systems. This can allow for more rapid scale-up and deployment of the fuel. Additionally, because the marine fuel is not a cryogenic liquid, there is no boil-off to manage, which can reduce or minimize fuel handling and storage concerns relative to LNG.

In this discussion, an ultra clean residual marine fuel can correspond to a residual fuel with an unexpected combination of properties. The fuel can have a sulfur content of 150 wppm or less, or 100 wppm or less, or 10 wppm or less, or 5.0 wppm or less, such as down to 0.1 wppm or possibly still lower. An ultra clean marine fuel can also have a nitrogen content of 10 wppm or less, or 5.0 wppm or less, such as down to 0.1 wppm or possibly still lower. Additionally, the micro carbon residue content of the fuel can be 1.0 wt % or less, or 0.5 wt % or less, such as down to having substantially no micro carbon residue content (less than 0.1 wt %). Still other beneficial properties of an ultra clean residual marine fuel can be low density and kinematic viscosity. Based in part on the reduced level of aromatics, the density and kinematic viscosity at 50° C. of the fuel can meet various types of residual fuel specifications without the need for blending a distillate fraction or flux into the fuel. This can allow the residual fuel to have a flash point of 100° C. or more, or 150° C. or more, such as up to 250° C. or possibly still higher.

In some aspects, the aromatics content of the ultra clean residual fuel oil can be 5.0 wt % to 25 wt %, or 10 wt % to 25 wt %, or 12 wt % to 25 wt %, or 5.0 wt % to 20 wt %, or 10 wt % to 20 wt %, or 12 wt % to 20 wt %, or 5.0 wt % to 15 wt %.

By forming an ultra clean residual fuel oil, the amount of SOx emissions generated during use of a fuel oil can be reduced or minimized, so that the sulfur emissions when using an ultra clean residual fuel oil are within 20% of the emissions level that would be generated when using LNG as a fuel, or within 15% of the emissions level, or within 10%, such as down to having substantially the same sulfur emissions level as would be generated when using LNG as a fuel. Additionally or alternately, the NOx emissions and/or the soot generated by combustion of the ultra clean residual fuel oil can be comparable to the emissions level for an LNG and/or reduced relative to a conventional fuel. By having a sufficiently low nitrogen content, the nitrogen emissions from an ultra clean residual marine fuel can be comparable to a LNG fuel. By having a low aromatics content, the amount of soot generated by combustion of the ultra clean residual marine fuel can be reduced or minimized.

Because of the low initial sulfur content and low nitrogen content of a bottoms fraction from a selected crude oil, such a bottoms fraction can be hydrotreated under lower severity conditions while still achieving a sulfur level of 150 wppm or less and a nitrogen level of 100 wppm or less. For a conventional resid fraction, the starting sulfur content can be 1.0 wt % or more. Hydroprocessing such a conventional resid fraction to achieve sulfur content of less than 1000 wppm typically requires conditions that are severe enough to perform substantial boiling point conversion of the feed. For example, substantial portions of the 565° C.+ components in such a resid can be converted to lower boiling components, such as conversion of 20 wt % or more of 565° C.+ components to lower boiling components, or 40 wt % or more. This substantial amount of conversion is a clear indicator of high severity hydroprocessing, leading to increased carbon intensity. Additionally, based on the low density and low kinematic viscosity, a hydrotreated distillate flux does not need to be blended with the bottoms fraction to meet many residual fuel specifications. As a result, an ultra clean residual fuel oil can have a reduced or minimized carbon intensity relative to an ultra low sulfur fuel oil formed from a conventional source.

Still other properties of an ultra clean residual marine fuel composition can include a density at 15° C. of 800 kg/m³ to 930 kg/m³, or 800 kg/m³ to 900 kg/m³ or 800 kg/m³ to 860 kg/m³, or 800 kg/m³ to 840 kg/m³; a kinematic viscosity at 50° C. of 5.0 cSt to 100 cSt, or 5.0 cSt to 40 cSt, or 5.0 cSt to 20 cSt; a kinematic viscosity at 100° C. of 2 cSt to 15 cSt; a viscosity index of 80 or more, or 100 or more, or 110 or more, or 120 or more, such as up to 150 or possibly still higher; a CCAI of 730 to 780, or 730 to 760; a Bureau of Mines Correlation Index (BMCI) of 50 or less, or 40 or less, or 30 or less, or 15 or less, such as down to 5 or possibly still lower; an energy content of 43.0 MJ/kg or more; and a pour point of −10° C. or higher, or −5.0° C. or higher, or 0° C. or higher, or 10° C. or higher, or 20° C. or higher, such as up to 40° C. or possibly still higher.

In some aspects, the ultra clean residual marine fuel composition can correspond to an atmospheric resid fraction, with a T10 distillation point of 320° C. or more, or 350° C. or more. In other aspects, the ultra clean residual marine fuel composition can correspond to a vacuum resid fraction, with a T10 distillation point of 400° C. or more, or 425° C. or more. In some aspects where the sulfur content is reduced to 20 wppm or less, or 10 wppm or less, or 5.0 wppm or less, the T90 distillation point can be 525° C. or less, or 500° C. or less. In some aspects where the sulfur content is 25 wppm to 150 wppm, or 50 wppm to 150 wppm, the T90 distillation point can be 525° C. or more, or 550° C. or more.

In some aspects, an ultra clean residual marine fuel as described herein may be blended with one or more renewable blending components to further reduce carbon intensity and enhance properties. An ultra clean residual marine fuel can also be an advantaged blend component with conventional blending components due to its beneficial combination of properties, such as low sulfur, low nitrogen, and high natural cetane. Because of this combination of properties, an ultra clean residual marine fuel can be used to upgrade lower quality streams (e.g. higher sulfur, higher density, lower cetane) into the marine fuel pool.

In this discussion, renewable blending components can correspond to renewable distillate and/or vacuum gas oil and/or vacuum resid boiling range components that are renewable based on one or more attributes. Some renewable blending components can correspond to components that are renewable based on being of biological origin. Examples of renewable blending components of biological origin can include, but are not limited to, fatty acid methyl esters (FAME), fatty acid alkyl esters, biodiesel, biomethanol, biologically derived dimethyl ether, oxymethylene ether, liquid derived from biomass, pyrolysis products from pyrolysis of biomass, products from gasification of biomass, and hydrotreated vegetable oil. Other renewable blending components can correspond to components that are renewable based on being extracted from a reservoir using renewable energy, such as petroleum extracted from a reservoir using an extraction method that is powered by renewable energy, such as electricity generated by solar, wind, or hydroelectric power. Still other renewable blending components can correspond to blending components that are made or processed using renewable energy, such as Fischer-Tropsch distillate that is formed using processes that are powered by renewable energy, or conventional petroleum distillate that is hydroprocessed/otherwise refinery processed using reactors that are powered by renewable energy. Yet other renewable blending components can correspond to fuel blending components formed from recycling and/or processing of municipal solid waste, or another source of carbon-containing waste. An example of processing of waste is pyrolysis and/or gasification of waste, such as gasification of municipal solid waste.

The lower carbon intensity of a fuel containing at least a portion of an ultra clean residual marine fuel as described herein can be realized by using a fuel containing at least a portion of such an ultra clean residual marine fuel in any convenient type of combustion powered device. In some aspects, a fuel containing at least a portion of an ultra clean residual marine fuel as described herein can be used as fuel for a combustion engine in a ground transportation vehicle, a marine vessel, or another convenient type of vehicle. Still other types of combustion devices can include generators, furnaces, and other combustion devices that are used to provide heat or power.

Based on the unexpected combinations of compositional properties, the ultra clean residual marine fuel compositions can be used to produce fuels and/or fuel blending products that also generate reduced or minimized amounts of other undesired combustion products. The other undesired combustion products that can be reduced or minimized can include sulfur oxide compounds (SOx), nitrogen oxide compounds (NOx), and soot. The low sulfur oxide production is due to the unexpectedly low sulfur content of the compositions. The high naphthenes to aromatics ratio can allow for a cleaner burning fuel, resulting in less incomplete combustion that produces soot. The lower nitrogen oxide production can be due to a corresponding low nitrogen content that is also observed in these low carbon intensity compositions.

It has been discovered that selected shale crude oils are examples of crude oils having an unexpected combination of high saturates content, a low sulfur content, and low nitrogen content. In various aspects, a shale oil fraction can be included as part of a fuel or fuel blending product. Examples of shale oils that provide this unexpected combination of properties include selected shale oils extracted from the Permian basin. For convenience, unless otherwise specified, it is understood that references to incorporation of a shale oil fraction into a fuel also include incorporation of such a fraction into a fuel blending product.

Definitions

All numerical values within the detailed description and the claims herein are modified by "about" or "approximately" the indicated value, and take into account experimental error and variations that would be expected by a person having ordinary skill in the art.

In this discussion, a shale crude oil is defined as a petroleum product with a final boiling point greater than 550° C., or greater than 600° C., that is extracted from a shale petroleum source. A shale oil fraction is defined as a boiling range fraction derived from a shale crude oil.

Unless otherwise specified, distillation points and boiling points can be determined according to ASTM D2887. For samples that are not susceptible to characterization using ASTM D2887, D7169 can be used. It is noted that still other methods of boiling point to characterization may be provided in the examples. The values generated by such other methods are believed to be indicative of the values that would be obtained under ASTM D2887 and/or D7169.

In this discussion, the distillate boiling range is defined as 170° C. to 566° C. A distillate boiling range fraction is defined as a fraction having a T10 distillation point of 170° C. or more and a T90 distillation point of 565° C. or less. The diesel boiling range is defined as 170° C. to 370° C. A diesel boiling range fraction is defined as a fraction having a T10 distillation point of 170° C. or more, a final boiling point of 300° C. or more, and a T90 distillation point of 370° C. or less. An atmospheric resid is defined as a bottoms fraction having a T10 distillation point of 149° C. or higher, or 330° C. or higher, such as a T10 distillation point up to 400° C. The vacuum gas oil boiling range is defined as 370° C. to 565° C. A vacuum gas oil boiling range fraction (also referred to as a heavy distillate) can have a T10 distillation point of 350° C. or higher and a T90 distillation point of 535° C. or less. A vacuum resid is defined as a bottoms fraction having a T10 distillation point of 400° C. or higher. The naphtha boiling range is defined as roughly 30° C. to 177° C. It is noted that the boiling point of $C_5$ paraffins is roughly 30° C., so the naphtha boiling range can alternatively be referred to as $C_5$ –177° C. A naphtha boiling range fraction is defined as a fraction having a T10 distillation point of 30° C. or more and a T90 distillation point of 177° C. or less. It is noted that the definitions for distillate boiling range fraction, kerosene (or jet fuel) boiling range fraction, diesel boiling range fraction, naphtha boiling range fraction, atmospheric resid, and vacuum resid are based on boiling point only. Thus, a resid fraction (such as a resid fraction in an ultra clean residual marine fuel) can include components that did not pass through a distillation tower or other separation stage based on boiling point. A shale oil resid fraction is defined as a shale oil fraction corresponding to a resid boiling range (atmospheric resid or vacuum resid).

In some aspects, a shale oil fraction that is incorporated into a fuel or fuel blending product can correspond to a shale oil fraction that has not been hydroprocessed and/or that has not been cracked. In this discussion, a non-hydroprocessed fraction is defined as a fraction that has not been exposed to more than 10 psia of hydrogen in the presence of a catalyst comprising a Group VI metal, a Group VIII metal, a catalyst comprising a zeolitic framework, or a combination thereof. In this discussion, a non-cracked fraction is defined as a fraction that has not been exposed to a temperature of 400° C. or more.

In this discussion, a hydroprocessed fraction refers to a hydrocarbon fraction and/or hydrocarbonaceous fraction that has been exposed to a catalyst having hydroprocessing activity in the presence of 300 kPa-a or more of hydrogen at a temperature of 200° C. or more. Examples of hydroprocessed fractions include hydroprocessed distillate fractions (i.e., a hydroprocessed fraction having the distillate boiling range), hydroprocessed kerosene fractions (i.e., a hydroprocessed fraction having the kerosene boiling range) and hydroprocessed diesel fractions (i.e., a hydroprocessed fraction having the diesel boiling range). It is noted that a hydroprocessed s fraction derived from a biological source, such as hydrotreated vegetable oil, can correspond to a hydroprocessed distillate fraction, a hydroprocessed kerosene fraction, and/or a hydroprocessed diesel fraction, depending on the boiling range of the hydroprocessed fraction. A hydroprocessed fraction can be hydroprocessed prior to separation of the fraction from a crude oil or another wider boiling range fraction.

With regard to characterizing properties of resid boiling range fractions and/or blends of such fractions with other components to form resid boiling range fuels, a variety of methods can be used. Density of a blend at 15° C. (kg/m$^3$) can be determined according ASTM D4052. Sulfur (in wppm or wt %) can be determined according to ASTM D2622, while nitrogen (in wppm or wt %) can be determined according to D4629. Kinematic viscosity at 50° C., 70° C., and/or 100° C. can be determined according to ASTM D445. It is noted that some values in this discussion were calculated according to ASTM D341 after determination of two other kinematic viscosities according to ASTM D445. Pour point can be determined according to ASTM D5950. Cloud point can be determined according to D2500. Micro Carbon Residue (MCR) content can be determined according to ASTM D4530. The content of n-heptane insolubles can be determined according to ASTM D3279. BMCI and CCAI are calculated values that can be derived from other measured quantities. Flash point can be determined according to ASTM D93. The metals content can be determined according to ASTM D8056. Nitrogen can be determined according to D4629 for lower concentrations and D5762 for higher concentrations, as appropriate.

With regard to determining paraffin, naphthene, and aromatics contents, supercritical fluid chromatography (SFC) was used. The characterization was performed using a commercial supercritical fluid chromatograph system, and the methodology represents an expansion on the methodology described in ASTM D5186 to allow for separate characterization of paraffins and naphthenes. The expansion on the ASTM D5186 methodology was enabled by using additional separation columns, to allow for resolution of naphthenes and paraffins. The system was equipped with the following components: a high pressure pump for delivery of supercritical carbon dioxide mobile phase; temperature controlled column oven; auto-sampler with high pressure liquid injection valve for delivery of sample material into mobile phase; flame ionization detector; mobile phase splitter (low dead volume tee); back pressure regulator to keep the $CO_2$ in supercritical state; and a computer and data system for control of components and recording of data signal. For analysis, approximately 75 milligrams of sample was diluted in 2 milliliters of toluene and loaded in standard septum cap autosampler vials. The sample was introduced based via the high pressure sampling valve. The SFC separation was performed using multiple commercial silica packed columns (5 micron with either 60 or 30 angstrom pores) connected in series (250 mm in length either 2 mm or 4 mm ID). Column temperature was held typically at 35 or 40° C. For analysis, the head pressure of columns was typically 250 bar. Liquid $CO_2$ flow rates were typically 0.3 ml/minute for 2 mm ID columns or 2.0 ml/minute for 4 mm ID columns. The SFC FID signal was integrated into paraffin and naphthenic regions. In addition to characterizing aromatics according to ASTM D5186, a supercritical fluid chromatograph was used to analyze samples for split of total paraffins and total naphthenes. A variety of standards employing typical molecular types can be used to calibrate the paraffin/naphthene split for quantification.

In this discussion, the term "paraffin" refers to a saturated hydrocarbon chain. Thus, a paraffin is an alkane that does not include a ring structure. The paraffin may be straight-chain or branched-chain and is considered to be a non-ring compound. "Paraffin" is intended to embrace all structural isomeric forms of paraffins.

In this discussion, the term "naphthene" refers to a cycloalkane (also known as a cycloparaffin). Therefore, naphthenes correspond to saturated ring structures. The term naphthene encompasses single-ring naphthenes and multi-ring naphthenes. The multi-ring naphthenes may have two or more rings, e.g., two-rings, three-rings, four-rings, five-rings, six-rings, seven-rings, eight-rings, nine-rings, and ten-rings. The rings may be fused and/or bridged. The naphthene can also include various side chains, such as one or more alkyl side chains of 1-10 carbons.

In this discussion, the term "saturates" refers to all straight chain, branched, and cyclic paraffins. Thus, saturates correspond to a combination of paraffins and naphthenes.

In this discussion, the term "aromatic ring" means five or six atoms joined in a ring structure wherein (i) at least four of the atoms joined in the ring structure are carbon atoms and (ii) all of the carbon atoms joined in the ring structure are aromatic carbon atoms. Therefore, aromatic rings correspond to unsaturated ring structures. Aromatic carbons can be identified using, for example, $^{13}C$ Nuclear Magnetic Resonance. Aromatic rings having atoms attached to the ring (e.g., one or more heteroatoms, one or more carbon atoms, etc.) but which are not part of the ring structure are within the scope of the term "aromatic ring." Additionally, it is noted that ring structures that include one or more heteroatoms (such as sulfur, nitrogen, or oxygen) can correspond to an "aromatic ring" if the ring structure otherwise falls within the definition of an "aromatic ring".

In this discussion, the term "non-aromatic ring" means four or more carbon atoms joined in at least one ring structure wherein at least one of the four or more carbon atoms in the ring structure is not an aromatic carbon atom. Non-aromatic rings having atoms attached to the ring (e.g., one or more heteroatoms, one or more carbon atoms, etc.), but which are not part of the ring structure, are within the scope of the term "non-aromatic ring."

In this discussion, the term "aromatics" refers to all compounds that include at least one aromatic ring. Such compounds that include at least one aromatic ring include compounds that have one or more hydrocarbon substituents. It is noted that a compound including at least one aromatic ring and at least one non-aromatic ring falls within the definition of the term "aromatics".

It is noted that that some hydrocarbons present within a feed or product may fall outside of the definitions for paraffins, naphthenes, and aromatics. For example, any alkenes that are not part of an aromatic compound would fall outside of the above definitions. Similarly, non-aromatic compounds that include a heteroatom, such as sulfur, oxygen, or nitrogen, are not included in the definition of paraffins or naphthenes.

Life Cycle Assessment and Carbon Intensity

Life cycle assessment (LCA) is a method of quantifying the "comprehensive" environmental impacts of manufactured products, including fuel products, from "cradle to grave". Environmental impacts may include greenhouse gas (GHG) emissions, freshwater impacts, or other impacts on the environment associated with the finished product. The general guidelines for LCA are specified in ISO 14040.

The "carbon intensity" of a fuel product (e.g. residual fuel) is defined as the life cycle GHG emissions associated with that product (kg $CO_2$eq) relative to the energy content of that fuel product (MJ, LHV basis). Life cycle GHG emissions associated with fuel products must include GHG emissions associated with crude oil production; crude oil transportation to a refinery; refining of the crude oil; transportation of the refined product to point of "fill"; and combustion of the fuel product.

GHG emissions associated with the stages of refined product life cycles are assessed as follows.

(1) GHG emissions associated with drilling and well completion—including hydraulic fracturing, shall be normalized with respect to the expected ultimate recovery of sales-quality crude oil from the well.

(2) All GHG emissions associated with the production of oil and associated gas, including those associated with (a) operation of artificial lift devices, (b) separation of oil, gas, and water, (c) crude oil stabilization and/or upgrading, among other GHG emissions sources shall be normalized with respect to the volume of oil transferred to sales (e.g. to crude oil pipelines or rail). The fractions of GHG emissions associated with production equipment to be allocated to crude oil, natural gas, and other hydrocarbon products (e.g. natural gas liquids) shall be specified accordance with ISO 14040.

(3) GHG emissions associated with rail, pipeline or other forms of transportation between the production site(s) to the refinery shall be normalized with respect to the volume of crude oil transferred to the refinery.

(4) GHG emissions associated with the refining of crude oil to make liquefied petroleum gas, gasoline, distillate fuels and other products shall be assessed, explicitly accounting for the material flows within the refinery. These emissions shall be normalized with respect to the volume of crude oil refined.

(5) All of the preceding GHG emissions shall be summed to obtain the "Well to refinery" (WTR) GHG intensity of crude oil (e.g. kg $CO_2$eq/bbl crude).

(6) For each refined product, the WTR GHG emissions shall be divided by the product yield (barrels of refined product/barrels of crude), and then multiplied by the share of refinery GHG specific to that refined product. The allocation procedure shall be conducted in accordance with ISO 14040. This procedure yields the WTR GHG intensity of each refined product (e.g. kg $CO_2$eq/bbl gasoline).

(7) GHG emissions associated with rail, pipeline or other forms of transportation between the refinery and point of fueling shall be normalized with respect to the volume of each refined product sold. The sum of the GHG emissions associated with this step and the previous step of this procedure is denoted the "Well to tank" (WTT) GHG intensity of the refined product.

(8) GHG emissions associated with the combustion of refined products shall be assessed and normalized with respect to the volume of each refined product sold.

(9) The "carbon intensity" of each refined product is the sum of the combustion emissions (kg $CO_2$eq/bbl) and the "WTT" emissions (kg $CO_2$eq/bbl) relative to the energy value of the refined product during combustion. Following the convention of the EPA Renewable Fuel Standard 2, these emissions are expressed in terms of the low heating value (LHV) of the fuel, i.e. g $CO_2$eq/MJ refined product (LHV basis).

In the above methodology, the dominant contribution for the amount of $CO_2$ produced per MJ of refined product is the $CO_2$ formed during combustion of the product. Because the $CO_2$ generated during combustion is such a high percentage of the total carbon intensity, achieving even small or incremental reductions in carbon intensity has traditionally been challenging. In various aspects, it has been discovered that resid fractions derived from selected crude oils can be used to form fuels with reduced carbon intensities. The selected crude oils correspond to crude oils with high naphthenes to aromatics ratios, low sulfur content, and a low but substantial aromatics content. This combination of features can allow for formation of a resid fraction from the crude oil that requires a reduced or minimized amount of refinery processing in order to make a fuel product and/or fuel blending product that corresponds to an ultra clean residual marine fuel.

In this discussion, a low carbon intensity fuel or fuel blending product corresponds to a fuel or fuel blending product that has reduced GHG emissions per unit of lower of heating value relative to a fuel or fuel blending product derived from a conventional petroleum source. In some aspects, the reduced GHG emissions can be due in part to reduced refinery processing. For example, fractions that are not hydroprocessed for sulfur removal have reduced well-to-refinery emissions relative to fractions that require hydroprocessing prior to incorporation into a fuel. In various aspects, an unexpectedly high weight ratio of naphthenes to aromatics in a shale oil fraction can indicate a fraction with reduced GHG emissions, and therefore a lower carbon intensity.

Another indicator of a low carbon intensity fuel can be a reduced or minimized nitrogen content. Atmospheric resid fractions and vacuum resid fractions derived from conventional crude oils typically have a substantial nitrogen content prior to hydrotreatment. Because nitrogen content is not restricted in the specification for many types of marine fuels, the hydrotreatment of a residual fraction is typically focused on reducing sulfur to a desired or target level. Due to difficulties with removing nitrogen at elevated levels with conventional hydrotreating catalysts and conditions, even very low sulfur marine fuels often still have a substantial nitrogen content. By contrast, the ultra clean marine residual fuels described herein are derived from resid fractions from selected crude oils (such as selected shale crude oils) that have lower initial nitrogen contents. This can allow the reduced severity hydrotreatment conditions used for reducing sulfur to 150 wppm or less to also be sufficient for reducing the nitrogen content to 100 wppm or less, or 20 wppm or less, or 10 wppm or less, such as down to 0.1 wppm or possibly still lower. It is noted that for crude oils with higher nitrogen content, the high nitrogen content can cause additional difficulties during hydroprocessing due to suppression of catalyst activity. At lower starting nitrogen contents, such as nitrogen contents of 1000 wppm or less, the amount of nitrogen removal (on a percentage basis) during hydrotreatment can be roughly proportional to the amount of sulfur removal. At higher nitrogen contents, the nitrogen can suppress the activity of a hydrotreatment catalyst for nitrogen removal, so that the percentage of nitrogen removed is decreased relative to the percentage of sulfur removal.

Yet other ways of reducing carbon intensity for a hydrocarbon fraction can be related to methods used for extraction of a crude oil. For example, carbon intensity for a fraction can be reduced by using solar power, hydroelectric power, or another renewable energy source as the power source for equipment involved in the extraction process, either during drilling and well completion and/or during production of crude oil. As another example, extracting crude oil from an extraction site without using artificial lift can reduce the carbon intensity associated with a fuel.

Hydrotreatment of Resid Fractions to Form Ultra Clean Marine Fuel Oils

In various aspects, a fraction including an atmospheric resid portion and/or a vacuum resid portion derived from a selected crude oil (such as a selected shale crude oil) can be hydrotreated in one or more hydrotreatment stages to produce a fraction including an ultra clean marine fuel oil. Optionally, the fraction including the resid portion (atmospheric resid or vacuum resid) can correspond to the whole crude oil. Alternatively, a separation can be performed on a crude or crude fraction to form the fraction including the resid portion. After hydrotreatment, the hydrotreated effluent can optionally be separated to form an ultra clean marine residual fuel and/or fuel blending product. Alternatively, if sufficient separation is performed prior to hydrotreatment, an ultra clean marine residual fuel and/or fuel blending product can be formed by removing gas phase contaminants and other light ends from the hydrotreated effluent.

In various aspects, the fraction including an atmospheric resid can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/ measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable s for hydrotreatment of a distillate (including lubricant base stock) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than about 0.01 wt %.

The at least one Group VIII non-noble metal, in oxide form, can typically be present in an amount ranging from about 2 wt % to about 40 wt %, preferably from about 4 wt % to about 15 wt %. The at least one Group VI metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this disclosure, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane). The treat gas stream introduced into a reaction stage will preferably contain at least about 50 vol. % and more preferably at least about 75 vol. % hydrogen. Optionally, the hydrogen treat gas can be substantially free (less than 1 vol %) of impurities such as $H_2S$ and $NH_3$ and/or such impurities can be substantially removed from a treat gas prior to use.

Hydrogen can be supplied at a rate of from about 100 SCF/B (standard cubic feet of hydrogen per barrel of feed) (17 Nm$^3$/m$^3$) to about 10000 SCF/B (1700 Nm$^3$/m$^3$). Preferably, the hydrogen is provided in a range of from about 200 SCF/B (34 Nm$^3$/m$^3$) to about 2500 SCF/B (420 Nm$^3$/m$^3$). Hydrogen can be supplied co-currently with the input feed to the hydrotreatment to reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 h$^{-1}$ to 10 hr$^{-1}$; and hydrogen treat rates of 200 scf/B (35.6 m$^3$/m$^3$) to 10,000 scf/B (1781 m$^3$/m$^3$), or 500 (89 m$^3$/m$^3$) to 10,000 scf/B (1781 m$^3$/m$^3$).

In some aspects of the disclosure, the hydrotreatment stage(s) can reduce the sulfur content of the feed to a suitable level. For example, the sulfur content can be reduced to 150 wppm or less, or 100 wppm or less, or 50 wppm or less, or 10 wppm or less, or 5.0 wppm or less, such as down to 0.5 wppm or possibly still lower.

Characterization of Shale Crude Oils and Shale Oil Fractions—General

Shale crude oils were obtained from a plurality of different shale oil extraction sources. Assays were performed on the shale crude oils to determine various compositional characteristics and properties for the shale crude oils. The shale crude oils were also fractionated to form various types of fractions, including fractionation into atmospheric resid fractions, vacuum resid fractions, distillate fractions (including kerosene, diesel, and vacuum gas oil boiling range fractions), and naphtha fractions. Various types of characterization and/or assays were also performed on these additional fractions.

The characterization of the shale crude oils and/or crude oil fractions included a variety of procedures that were used to generate data. For example, data for boiling ranges and fractional distillation points was generated using methods similar to compositional or pseudo compositional analysis such as ASTM D2887. For compositional features, such as the amounts of paraffins, isoparaffins, olefins, naphthenes, and/or aromatics in a crude oil and/or crude oil fraction, data was generated using analytical techniques such as high pressure liquid chromatography (HPLC) and/or gas chromatography-mass spectrometry (GC-MS). Data related to pour point was generated using methods similar to ASTM D97. Data related to cloud point was generated using methods similar to ASTM D2500 and/or ASTM D5773. Data related to flash point was generated based on volatility calculations. Data related to sulfur content and nitrogen content of a crude oil and/or crude oil fraction was generated using methods similar to ASTMD2622, ASTM D4294, ASTM D5443, ASTM D4629, and/or ASTM 05762. Data related to carbon content and/or hydrogen content was calculated based on the compositional analysis. Data related to density (such as density at 15° C.) was generated using methods similar to ASTM D1298 and/or ASTM D4052. Data related to kinematic viscosity (such as kinematic viscosity at 40° C. or 50° C.) was generated using methods similar to ASTM D445 and/or ASTM D7042. Data related to micro carbon residue (MCR) content was generated using methods similar to ASTM D189 and/or ASTM D4530. Data related to cetane index was calculated from fractional distillation using techniques similar to those represented in the American Petroleum Institute Technical Data Book. Data related to acid number was generated using methods similar to ASTM 0664, ASTM D3242, ASTM D8045.

The data and other measured values for the shale crude oils and shale oil fractions were then incorporated into an existing data library of other representative conventional and non-conventional crude oils for use in an empirical model. The empirical model was used to provide predictions for compositional characteristics and properties for some additional shale oil fractions that were not directly characterized experimentally. In this discussion, data values provided by this empirical model will be described as modeled data. In this discussion, data values that are not otherwise labeled as modeled data correspond to measured values and/or values that can be directly derived from measured values. An example of such an empirical model is AVEVA Spiral Suite 2019.3 Assay by AVEVA Solutions Limited.

Figure 1:
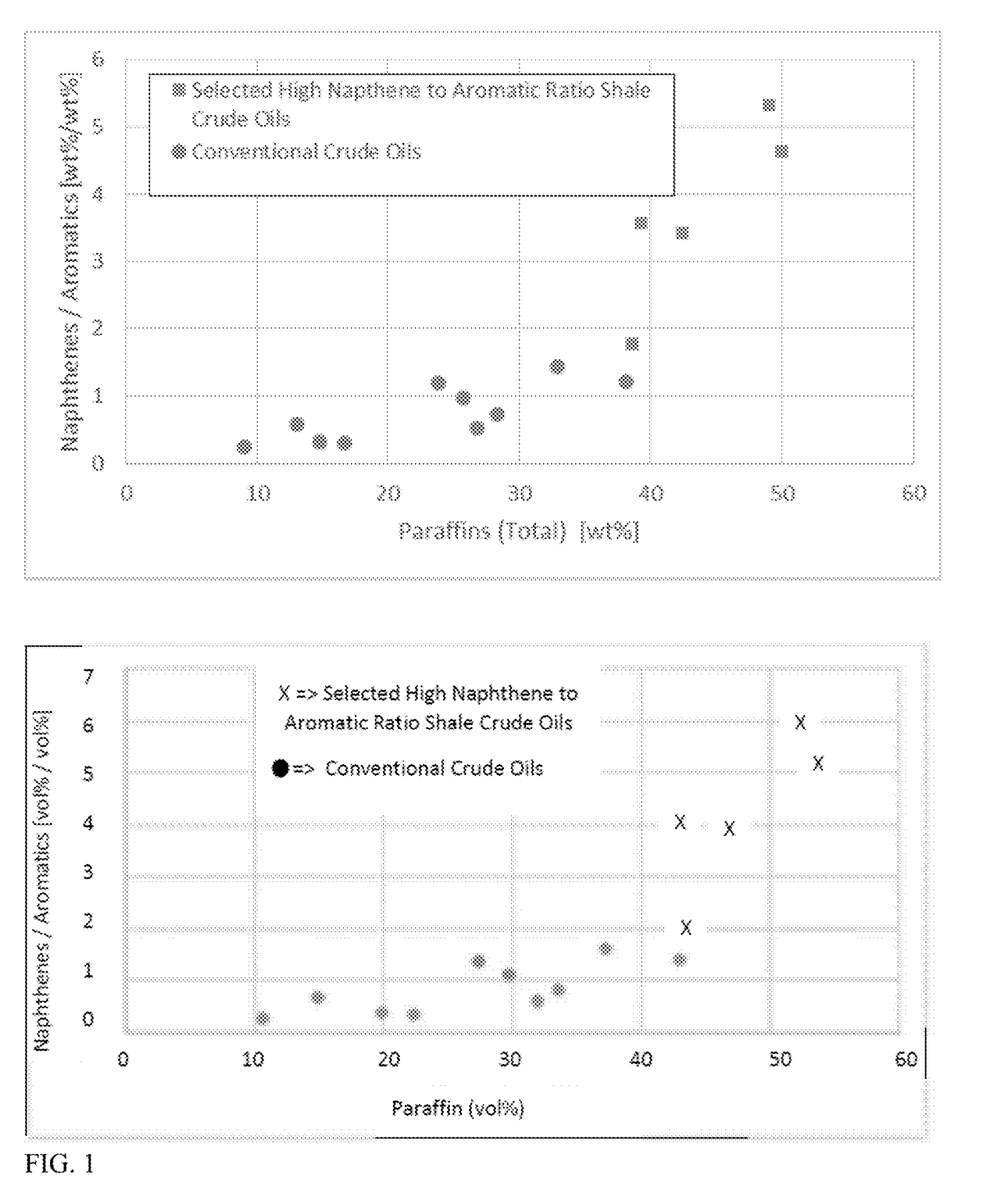
FIG. 1 shows compositional information for various crude oils.
Figure 2:
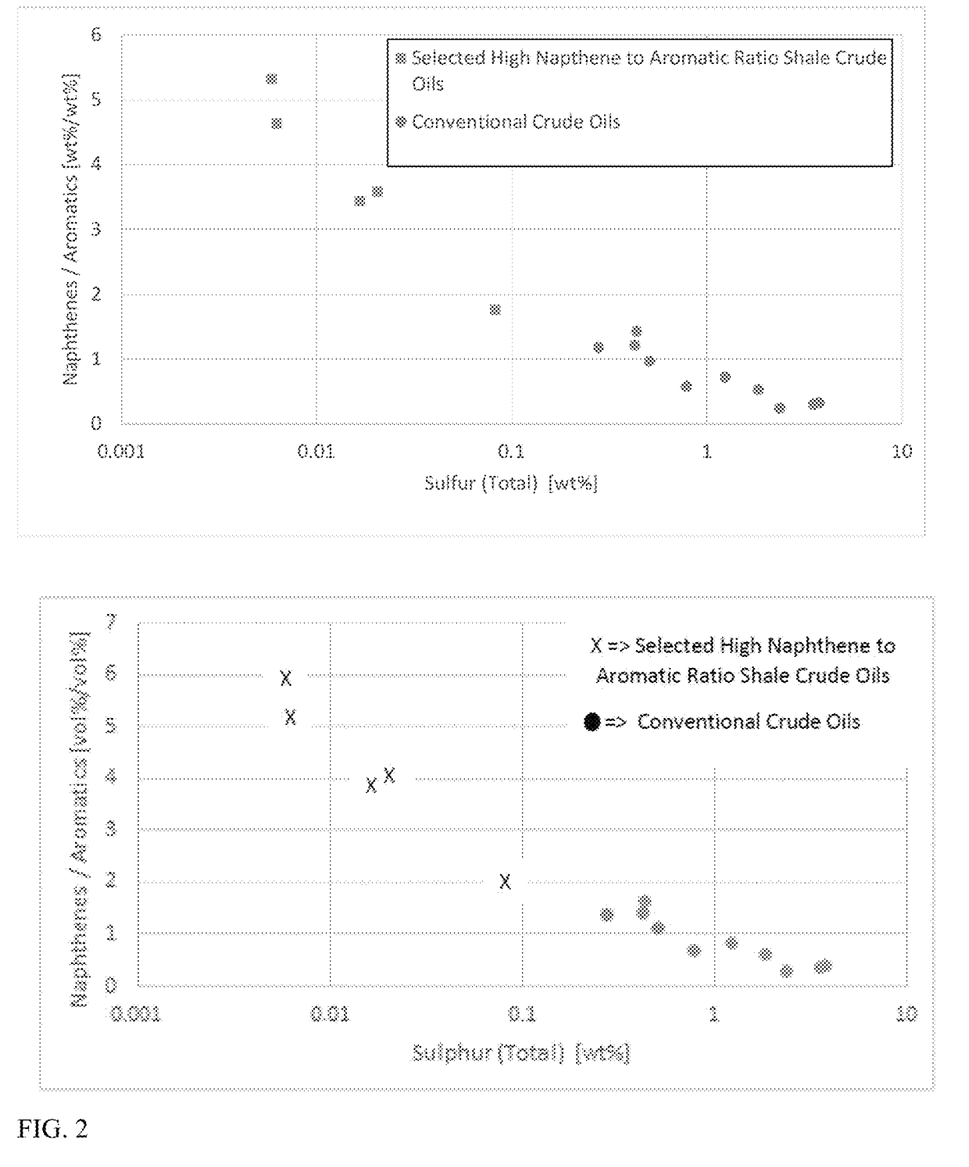
FIG. 2 shows compositional information for various crude oils.

FIGS. 1 and 2 show examples of the unexpected combinations of properties for shale crude oils that have a high weight ratio and/or volume ratio of naphthenes to aromatics. In FIG. 1, both the weight ratio and the volume ratio of naphthenes to aromatics is shown for five shale crude oils relative to the weight/volume percentage of paraffins in the shale crude oil. The top plot in FIG. 1 shows the weight ratio of naphthenes to aromatics, while the bottom plot shows the volume ratio. A plurality of other representative conventional crudes are also shown in FIG. 1 for comparison. As shown in FIG. 1, the selected shale crude oils described herein have a paraffin content of greater than 40 wt % while also having a weight ratio of naphthenes to aromatics of 1.8 or more. Similarly, as shown in FIG. 1, the selected shale crude oils described herein have a paraffin content of greater than 40 vol % while also having a weight ratio of naphthenes to aromatics of 2.0 or more. By contrast, none of the conventional crude oils shown in FIG. 1 have a similar combination of a paraffin content of greater than 40 wt % and a weight ratio of naphthenes to aromatics of 1.8 or more, or a combination of paraffin content of greater than 40 vol % and a weight ratio of naphthenes to aromatics of 2.0 or more. It has been discovered that this unexpected combination of naphthenes to aromatics ratio and paraffin content is present throughout various fractions that can be derived from such selected crude oils.

In FIG. 2, both the volume ratio and weight ratio of naphthenes to aromatics is shown for the five shale crude oils in FIG. 1 relative to the weight of sulfur in the crude. The sulfur content of the crude in FIG. 2 is plotted on a logarithmic scale. The top plot in FIG. 2 shows the weight ratio of naphthenes to aromatics, while the bottom plot shows the volume ratio. The plurality of other representative conventional crude oils are also shown for comparison. As shown in FIG. 2, the selected shale crude oils have naphthene to aromatic volume ratios of 2.0 or more, while all of the conventional crude oils have naphthene to aromatic volume ratios below 1.8. Similarly, as shown in FIG. 2, the selected shale crude oils have naphthene to aromatic weight ratios of 1.8 or more, while all of the conventional crude oils have naphthene to aromatic weight ratios below 1.6. Additionally, the selected shale crude oils have a sulfur content of roughly 0.1 wt % or less, while all of the conventional crude oils shown in FIG. 2 have a sulfur content of greater than 0.2 wt %. It has been discovered that this unexpected combination of high naphthene to aromatics ratio and low sulfur is present within various fractions that can be derived from such selected crude oils. This unexpected combination of properties contributes to the ability to produce low carbon intensity fuels from shale oil fractions and/or blends of shale oil fractions derived from the shale crude oils.

Characterization of Shale Oil Fractions—Hydrotreated Resid Fractions

In various aspects, hydrotreated resid fractions as described herein can be used as a fuel fraction, such as an ultra clean residual marine fuel and/or fuel blending component. The combination of low sulfur, low nitrogen, and low aromatics content can allow a hydrotreated resid fraction as described herein to be used as an ultra clean residual marine fuel with a reduced or minimized amount of refinery processing.

Figure 3:
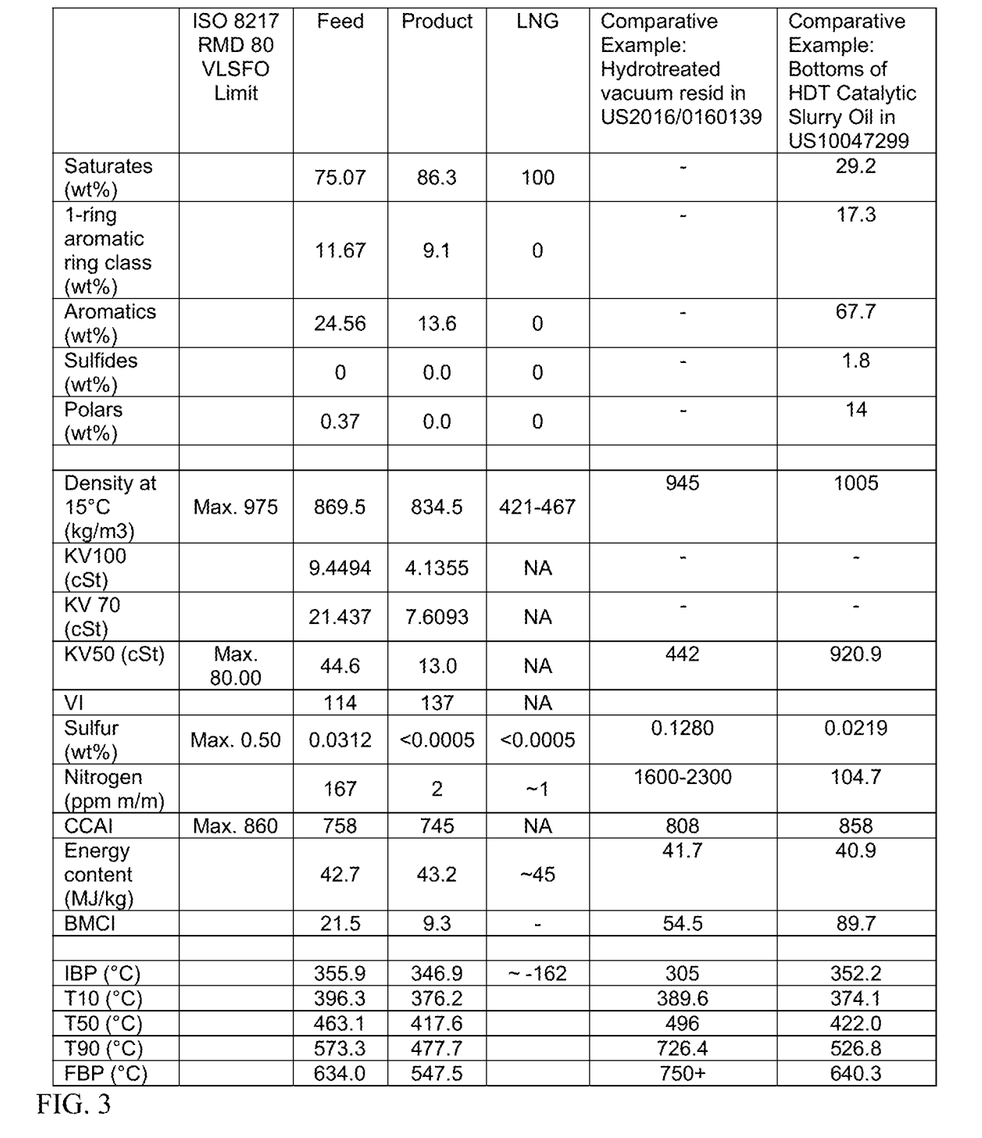
FIG. 3 shows modeled compositional values and properties for various resid boiling range fractions.

FIG. 3 shows measured values for an atmospheric resid feed derived from a selected shale oil fraction and a corresponding hydrotreated effluent from hydrotreating of the atmospheric resid feed. FIG. 3 also shows some comparative values for liquefied natural gas (LNG), a previously described hydrotreated vacuum resid (from U.S. Pat. No. 9,920,270), and a previously described hydrotreated product made corresponding to the bottoms of a hydrotreated catalytic slurry oil (from U.S. Pat. No. 10,047,299). The measured atmospheric resid compositional features and properties in FIG. 3 are based on an atmospheric resid produced using an initial cut point of roughly 371° C. This resulted in an initial boiling point between 330° C. and 370° C.; a T10 distillation point between 360° C. and 410° C., or between 370° C. and 410° C.; and a T90 distillation point greater than 450° C., such as up to 600° C. or possibly still higher. Due in part to the low sulfur content of the feed of less than 500 wppm, a relatively low severity resid hydrotreating process was able to reduce the sulfur content in the product to 5.0 wppm or less. However even at lower severity, because more than 90 wt % of the sulfur was removed, a substantial amount of boiling point conversion was performed. This can be seen, for example, in the difference between the T90 and final boiling points for the feed and product in FIG. 3.

Another feature of the hydrotreated resid fraction shown in FIG. 3 is a low nitrogen content. As shown in FIG. 3, the hydrotreated resid fraction has a nitrogen content of 5.0 wppm or less. This is in contrast to the conventional hydrotreated resid fraction from U.S. Pat. No. 9,920,270, which has a nitrogen content of greater than 1000 wppm.

Due to the substantially higher nitrogen content, the conventional hydrotreated vacuum resid would generate substantially more NOx than the low nitrogen content hydrotreated atmospheric resid shown in FIG. 3.

The hydrotreated atmospheric resid has still other unexpected and/or beneficial properties. For example, the density of the hydrotreated atmospheric resid fraction is between 810 kg/m$^3$ and 860 kg/m$^3$; a kinematic viscosity at 50° C. of less than 100 cSt, or less than 50 cSt, or less than 20 cSt, such as down to 5.0 cSt; a BMCI of 40 or less, or 30 or less, or 15 or less, such as down to 5.0 or possibly still lower; a viscosity index of 120 or more, or 130 or more; and a CCAI of less than 800, or less than 760, such as down to 730 or possibly still lower.

As shown in FIG. 3, the hydrotreated atmospheric resid has comparable sulfur content and nitrogen content relative to the liquefied natural gas sample. This indicates that the amount of SOx and NOx would also be comparable between the liquefied natural gas and the hydrotreated atmospheric resid. However, the hydrotreated atmospheric resid has a density and kinematic viscosity at 50° C. that allow the hydrotreated atmospheric resid to be used in conventional marine engines. Thus, the hydrotreated atmospheric resid can be used as a fuel with the unexpected property of providing the low pollutant levels of liquefied natural gas without requiring installation of a specialized engine and/or fuel handling system. This is in contrast to the properties of the comparative examples. For the comparative conventional hydrotreated vacuum resid fraction, the nitrogen content is substantially higher than the LNG product. For the comparative hydrotreated main column bottoms fraction, the sulfur and nitrogen contents are relatively low, but the fraction has a density that is too high to be suitable as a residual marine fuel. This is due in part to the large number of aromatics remaining in the hydrotreated main column bottoms. Such aromatics can also contribute to soot formation when combusted.

Figure 4:
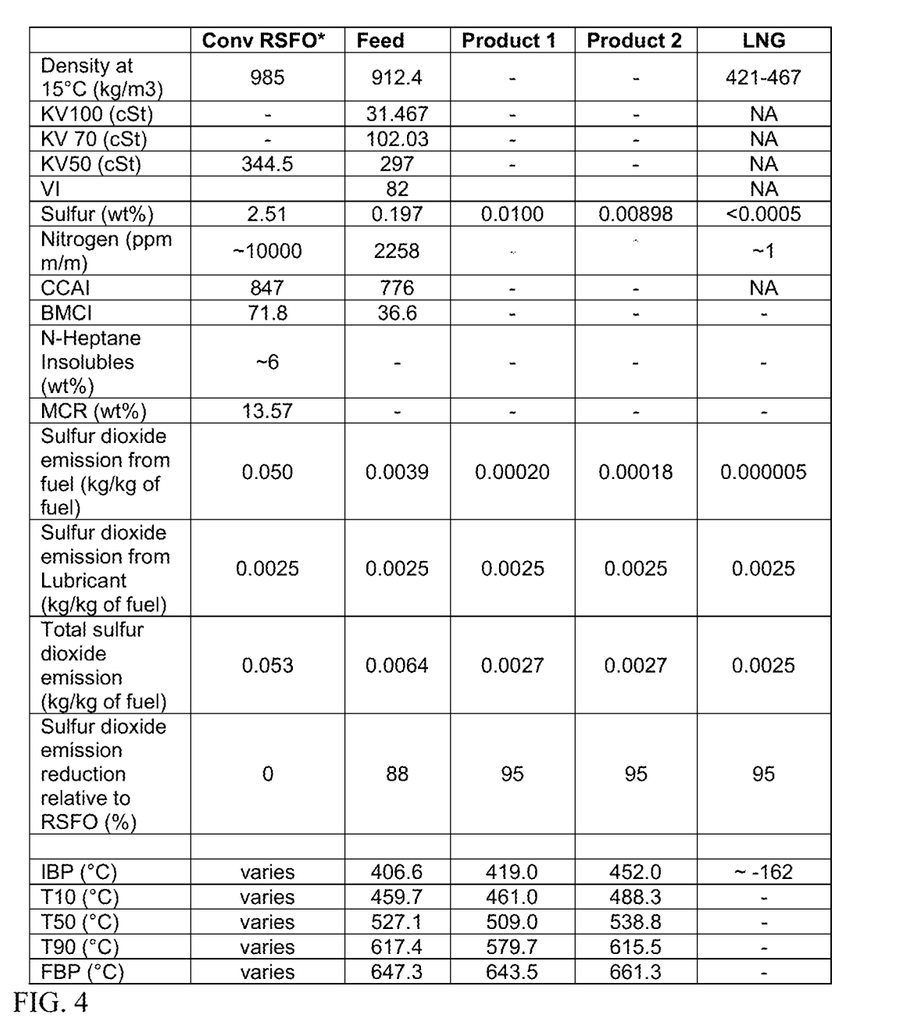
FIG. 4 shows compositional values and properties for various resid boiling range fractions.

FIG. 4 shows examples of additional hydrotreated resid fractions. In FIG. 4, a vacuum resid boiling range feed derived from a selected shale crude oil is shown, along with hydrotreated vacuum resids formed by hydrotreatment of the feed under two different hydrotreatment conditions. As shown in FIG. 4, the feed was hydrotreated to reduce the sulfur content in the two different products to roughly 100 wppm. While this sulfur content is higher than the less than 5.0 wppm sulfur content of a typical LNG fuel, it has been discovered that reducing the sulfur content to roughly 100 wppm can achieve roughly 90% or more of the sulfur reduction benefit to that is achieved by a LNG fuel.

During operation of a marine engine, portions of the engine lubricant can also enter the combustion zone(s) in the engine. As a result, the products from combustion of the lubricant also contribute to the emissions generated by a marine engine. As shown in FIG. 4, the sulfur dioxide generated from combustion of lubricant typically corresponds to roughly 0.0025 kg sulfur dioxide per kg of fuel that is combusted. When a conventional fuel oil is combusted, such as a fuel oil with a sulfur content of 1.0 wt % or more, the sulfur dioxide generated from combustion of the lubricant is small relative to the total sulfur dioxide. By contrast, for a fuel with a sulfur content of 150 wppm or less (such as LNG or an ultra clean residual marine fuel), the sulfur dioxide generated from combustion of the lubricant is large relative to the total sulfur dioxide. Thus, for a low aromatics content, low nitrogen feed, reducing the sulfur content to roughly 150 wppm or less can be sufficient to generate an ultra clean residual marine fuel with emissions similar to LNG.

The ultra clean residual marine fuels described herein can also be used as blending components for formation of fuels. For example, an ultra clean residual marine fuel can be blended with a renewable fraction, such as biodiesel or hydrotreated vegetable oil, to form a ultra clean residual marine fuel that has a further reduction in carbon intensity. Table 1 shows measured characteristics for two types of biodiesel and two types of hydrotreated vegetable oil.

TABLE 1

Renewable Blend Components

|  | Biodiesel 1 | Biodiesel 2 | HVO 1 | HVO 2 |
| --- | --- | --- | --- | --- |
| Density at 15° C. (kg/m3) | 881.1 | 879.6 | 795.5 | 777.7 |
| Viscosity at 50° C. (cSt) | 3.5 | 3.734 | 3.076 | 2.229 |
| Sulfur (ppm m/m) | ~5 | ~5 | ~5 | ~5 |
| CCAI | 828 | 824 | 746 | 741 |
| BMCI | 55 | 80 | 4 | −2 |
| TE | 0 | 0 | 0 | 0 |
| MCR (wt %) | 0.00 | 0.00 | 0.00 | 0.04 |
| Cloud Point (° C.) | −1 | >1 | 10 | −10 |
| Pour Point (° C.) | <−5 | 6 | 10 | −10 |

The four renewable fractions shown in Table 1 were modeled as blends with the product from FIG. 3. The model results are shown in Table 2. Table 2 also shows the specification for an RMD80 residual fuel oil.

TABLE 2

Blended Fuel Compositions

|  | ISO8217 RMD80 Spec | 90% FO + 10% Biodiesel 1 | 30% FO + 70% Biodiesel 2 | 95% FO + 5% HVO 2 | 40% FO + 60% HVO 1 |
| --- | --- | --- | --- | --- | --- |
| Density at 15° C. (kg/m3) | Max. 975 | 0.8392 | 0.8661 | 0.8317 | 0.8111 |
| KV50 (cSt) | Max. 80.00 | 11.1 | 5.2 | 11.6 | 5.1 |
| Sulfur (wt %) | Max. 0.50 | 0.0003 | 0.0004 | 0.0003 | 0.0004 |
| CCAI | Max. 860 | 754 | 800 | 745 | 746 |
| BMCI | — | 14 | 59 | 9 | 6 |
| TE | — | 0 | 0 | 0 | 0 |
| Pour Point (° C.) |  | 29 | 14 | 30 | 19 |
| N-Heptane Insolubles (wt %) | — | 0.0 | 0.0 | 0.0 | 0.0 |
| MCR (wt %) | Max. 14.00 | 0.0 | 0.0 | 0.0 | 0.0 |

As shown in Table 2, the modeled blends have low density at 15° C. (800 kg/m³ to 880 kg/m³, or 800 kg/m³ to 840 kg/m³), low CCAI (less than 820, or less than 800, or less than 770, such as down 720 or possibly still lower), and substantially no micro carbon residue. Based on the modeled blends shown in Table 2, an ultra clean residual marine fuel as described herein can be blended with renewable fractions to form another marine fuel with a sulfur content of 5.0 wppm or less. Such a blend can include from 10 wt % to 99 wt % of the ultra clean residual marine fuel, or 10 wt % to 95 wt %, or 20 wt % to 99 wt %, or 20 wt % to 95 wt %; and 1.0 wt % to 90 wt % of a renewable fraction, or 1.0 wt % to 80 wt %, or 5.0 wt % to 90 wt %, or 5.0 wt % to 80 wt %.

A hydrotreated atmospheric resid as described herein can also be blended with conventional distillate and/or residual fractions to form marine fuels. While such blends with conventional fractions may result in higher sulfur contents, the blends can still correspond to fuels that satisfy various residual fuel oil specifications. Such blends can include from 1.0 wt % to 99 wt % of an ultra clean residual marine fuel, with the balance corresponding to a conventional fraction, a renewable fraction, or a combination thereof. The resulting blend can correspond to a regular sulfur fuel oil (RSFO), a low sulfur fuel oil (LSFO) with a sulfur content of 0.5 wt % or less, or a very low sulfur fuel oil (VLSFO with a sulfur content of 0.1 wt % or less.

Where used as a blendstock for fuel oil blending, the ultra clean residual marine fuel may be blended with any of the following and any combination thereof to make a fuel oil: low sulfur diesel (sulfur content of less than 500 wppm), ultra low sulfur diesel (sulfur content <10 or <15 ppmw), low sulfur gas oil, ultra low sulfur gasoil, low sulfur kerosene, ultra low sulfur kerosene, hydrotreated straight run diesel, hydrotreated straight run gas oil, hydrotreated straight run kerosene, hydrotreated cycle oil, hydrotreated thermally cracked diesel, hydrotreated thermally cracked gas oil, hydrotreated thermally cracked kerosene, hydrotreated coker diesel, hydrotreated coker gas oil, hydrotreated coker kerosene, hydrocracker diesel, hydrocracker gas oil, hydrocracker kerosene, gas-to-liquid diesel, gas-to-liquid kerosene, hydrotreated vegetable oil, fatty acid methyl esters, non-hydrotreated straight-run diesel, non-hydrotreated straight-run kerosene, non-hydrotreated straight-run gas oil and any distillates derived from low sulfur crude slates, gas-to-liquid wax, and other gas-to-liquid hydrocarbons, non-hydrotreated cycle oil, non-hydrotreated fluid catalytic cracking slurry oil, non-hydrotreated pyrolysis gas oil, non-hydrotreated cracked light gas oil, non-hydrotreated cracked heavy gas oil, non-hydrotreated pyrolysis light gas oil, non-hydrotreated pyrolysis heavy gas oil, non-hydrotreated thermally cracked residue, non-hydrotreated thermally cracked heavy distillate, non-hydrotreated coker heavy distillates, non-hydrotreated vacuum gas oil, non-hydrotreated coker diesel, non-hydrotreated coker gasoil, non-hydrotreated coker vacuum gas oil, non-hydrotreated thermally cracked vacuum gas oil, non-hydrotreated thermally cracked diesel, non-hydrotreated thermally cracked gas oil, hydrotreated fats or oils such as hydrotreated vegetable oil, hydrotreated tall oil, etc., fatty acid methyl ester, Group I slack waxes, lube oil aromatic extracts, deasphalted oil, atmospheric tower bottoms, vacuum tower bottoms, steam cracker tar, any residue materials derived from low sulfur crude slates, LSFO, RSFO, other LSFO/RSFO blend stocks.

As needed, fuel or fuel blending component fractions may be additized with additives such as pour point improver, cetane improver, lubricity improver, etc. to improve properties and/or meet local specifications.

Additional Embodiments

Embodiment 1. A fuel or fuel blending component comprising a kinematic viscosity at 50° C. of 5.0 cSt to 100 cSt, a sulfur content of 150 wppm or less, a density at 15° C. of 800 kg/m³ to 900 kg/m³, and an aromatics content of 5.0 wt % to 25 wt %.

Embodiment 2. The fuel or fuel blending component of Embodiment 1, wherein the fuel or fuel blending component comprises a T90 distillation point of 525° C. or more, or wherein the fuel or fuel blending component comprises a sulfur content of 50 wppm to 150 wppm, or wherein the density at 15° C. is 800 kg/m³ to 860 kg/m³, or a combination thereof.

Embodiment 3. The fuel or fuel blending component of any of the above embodiments, wherein the sulfur content is 5.0 wppm or less, or wherein the nitrogen content is 5.0 wppm or less, or a combination thereof.

Embodiment 4. The fuel or fuel blending component of Embodiment 3, wherein the fuel or fuel blending component comprises a T90 distillation point of 525° C. or less, or wherein the fuel or fuel blending component comprises a viscosity index is 120 or more, or wherein the fuel or fuel blending component comprises a BMCI of 30 or less, or wherein the fuel or fuel blending component comprises a CCAI of 800 or less, or a combination thereof.

Embodiment 5. A fuel or fuel blending component comprising a density of 930 kg/m³ or less, a kinematic viscosity at 50° C. of 100 cSt or more, a sulfur content of 50 wppm to 150 wppm, a BMCI of 50 or less, and a CCAI of 800 or less.

Embodiment 6. The fuel or fuel blending component of Embodiment 5, wherein the fuel or fuel blending component comprises a T10 distillation point of 400° C. or more, or wherein the fuel or fuel blending component comprises a T90 distillation point of 550° C. or more, or wherein the fuel or fuel blending component comprises a viscosity index of 80 or more, or wherein the density at 15° C. is 800 kg/m³ to 900 kg/m³, or a combination thereof.

Embodiment 7. The fuel or fuel blending component of any of the above embodiments, wherein the fuel or fuel blending component comprises a nitrogen content of 100 wppm or less, or wherein the fuel or fuel blending component comprises a T10 distillation point of 350° C. or more, or wherein the fuel or fuel blending component comprises a pour point of 0° C. or more, or a combination thereof.

Embodiment 8. The fuel or fuel blending component of any of the above embodiments, wherein the aromatics content is 12 wt % to 25 wt %, or wherein the aromatics content is 5.0 wt % to 15 wt %.

Embodiment 9. A blended fuel or blended fuel blending component comprising 1.0 vol % to 80 vol % of a distillate fraction, a resid fraction, or a combination thereof, and 20 vol % to 99 vol % of a fuel or fuel blending component according to any of Embodiments 1-8.

Embodiment 10. The blended fuel or blended fuel blending component of Embodiment 9, wherein the distillate fraction, the resid fraction, or the combination thereof comprises a renewable fraction.

Embodiment 11. The blended fuel or blended fuel blending component of Embodiment 10, wherein the renewable fraction comprises a hydrotreated vegetable oil, a biodiesel, a fatty acid methyl ester, or a combination thereof.

Embodiment 12. A method for forming a fuel or fuel blending component, comprising: fractionating a crude oil comprising a final boiling point of 550° C. or more to form at least a resid-containing fraction, the crude oil comprising a naphthenes to aromatics volume ratio of 3.0 or more and a sulfur content of 0.2 wt % or less; and hydrotreating the resid-containing fraction to form a fuel or fuel blending component according to any of claims 1-8.

Embodiment 13. The method of Embodiment 12, wherein the resid-containing fraction is hydrotreated prior to the fractionating, the fractionating comprising forming at least the fuel or fuel blending component.

Embodiment 14. The method of Embodiment 12 or 13, further comprising blending the fuel or fuel blending component with a distillate fraction, resid fraction, or combination thereof to form a blended fuel or blended fuel blending component, wherein the blended fuel or is blended fuel blending component comprises 1.0 vol % to 80 vol % of the distillate fraction, resid fraction, or combination thereof, and 20 vol % to 99 vol % of the fuel or fuel blending component, the distillate fraction resid fraction or combination thereof optionally comprising a renewable fraction.

Embodiment 15. Use of a fuel, fuel blending component, blended fuel, or blended fuel blending component according to any of Embodiments 1-11 as a fuel in a combustion device.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A fuel or fuel blending component comprising a kinematic viscosity at 50° C. of 5.0 cSt to 100 cSt, a sulfur content of 150 wppm or less, a density at 15° C. of 800 kg/m$^3$ to 900 kg/m$^3$, a CCAI of 800 or less and an aromatics content of 5.0 wt % to 25 wt %.

2. The fuel or fuel blending component of claim 1, wherein the fuel or fuel blending component comprises a T90 distillation point of 525° C. or more, or wherein the fuel or fuel blending component comprises a sulfur content of 50 wppm to 150 wppm, or a combination thereof.

3. The fuel or fuel blending component of claim 1, wherein the sulfur content is 5.0 wppm or less, or wherein the nitrogen content is 5.0 wppm or less, or a combination thereof.

4. The fuel or fuel blending component of claim 1, wherein the fuel or fuel blending component comprises a T90 distillation point of 525° C. or less, or wherein the fuel or fuel blending component comprises a viscosity index is 120 or more, or wherein the fuel or fuel blending component comprises a BMCI of 30 or less, or a combination thereof.

5. The fuel or fuel blending component of claim 1, wherein the fuel or fuel blending component comprises a nitrogen content of 100 wppm or less, or wherein the density at 15° C. is 800 kg/m$^3$ to 860 kg/m$^3$, or wherein the fuel or fuel blending component comprises a T10 distillation point of 350° C. or more, or a combination thereof.

6. The fuel or fuel blending component of claim 1, wherein the aromatics content is 12 wt % to 25 wt %, or wherein the aromatics content is 5.0 wt % to 15 wt %.

7. The fuel or fuel blending component of claim 1, wherein the fuel or fuel blending component comprises 1.0 vol % to 80 vol % of a renewable fraction and 20 vol % to 99 vol % of a hydrotreated atmospheric resid fraction, the hydrotreated atmospheric resid fraction comprising a kinematic viscosity at 50° C. of 5.0 cSt to 100 cSt, a sulfur content of 150 wppm or less, a density at 15° C. of 800 kg/m$^3$ to 900 kg/m$^3$, and an aromatics content of 5.0 wt % to 25 wt %.

8. The fuel or fuel blending component of claim 7, wherein the renewable fraction comprises a hydrotreated vegetable oil, a biodiesel, a fatty acid methyl ester, or a combination thereof.

9. The fuel or fuel blending component of claim 1, wherein the fuel or fuel blending component comprises 1.0 vol % to 80 vol % of a distillate fraction, a resid fraction, or a combination thereof, and 20 vol % to 99 vol % of a hydrotreated resid fraction, the hydrotreated resid fraction comprising a kinematic viscosity at 50° C. of 5.0 cSt to 100 cSt, a sulfur content of 150 wppm or less, a density at 15° C. of 800 kg/m$^3$ to 900 kg/m$^3$, and an aromatics content of 5.0 wt % to 25 wt %.

10. The fuel or fuel blending component of claim 9, wherein the hydrotreated resid fraction comprises a sulfur content of 5.0 wppm or less, or wherein the hydrotreated resid fraction comprises a nitrogen content of 5.0 wppm or less, or a combination thereof.

11. The fuel or fuel blending component of claim 1, wherein the fuel or fuel blending component comprises a pour point of 0° C. or more.

12. A fuel or fuel blending component comprising a density of 930 kg/m$^3$ or less, a kinematic viscosity at 50° C. of 100 cSt or more, a sulfur content of 50 wppm to 150 wppm, a BMCI of 50 or less, and a CCAI of 800 or less.

13. The fuel or fuel blending component of claim 12, wherein the fuel or fuel blending component comprises a nitrogen content of 100 wppm or less, or wherein the density at 15° C. is 800 kg/m$^3$ to 900 kg/m$^3$, or a combination thereof.

14. The fuel or fuel blending component of claim 12, wherein the fuel or fuel blending component comprises a T10 distillation point of 400° C. or more, or wherein the fuel or fuel blending component comprises a T90 distillation point of 550° C. or more, or a combination thereof.

15. The fuel or fuel blending component of claim 12, wherein the fuel or fuel blending component comprises a viscosity index is 80 or more, or wherein the aromatics content is 12 wt % to 25 wt %, or a combination thereof.

16. The fuel or fuel blending component of claim 12, wherein the fuel or fuel blending component comprises 1.0 vol % to 80 vol % of a renewable fraction and 20 vol % to 99 vol % of a hydrotreated resid fraction, the hydrotreated resid fraction comprising a density of 930 kg/m$^3$ or less, a kinematic viscosity at 50° C. of 100 cSt or more, a sulfur content of 50 wppm to 150 wppm or less, a BMCI of 50 or less, and a CCAI of 800 or less.

17. The fuel or fuel blending component of claim 16, wherein the renewable component comprises a hydrotreated vegetable oil, a biodiesel, a fatty acid methyl ester, or a combination thereof.

18. A method for forming a hydrotreated resid-containing fraction, comprising:
fractionating a crude oil comprising a final boiling point of 550° C. or more to form at least a resid-containing fraction, the crude oil comprising a naphthenes to aromatics volume ratio of 2.0 or more and a sulfur content of 0.2 wt % or less; and
hydrotreating the resid-containing fraction to form a hydrotreated resid-containing fraction comprising a density of 930 kg/m$^3$ or less, a sulfur content of 150 wppm or less, a BMCI of 50 or less, and a CCAI of 800 or less.

19. The method of claim 18, wherein hydrotreated resid-containing fraction comprises a kinematic viscosity at 50° C. of 5.0 cSt to 100 cSt, a sulfur content of 150 wppm or less, a density at 15° C. of 800 kg/m$^3$ to 900 kg/m$^3$, and an aromatics content of 5.0 wt % to 25 wt %.

20. The method of claim 18, wherein the resid-containing fraction is hydrotreated prior to the fractionating, the fractionating comprising forming at least the hydrotreated resid-containing fraction.

21. The method of claim 18, wherein the hydrotreated resid-containing fraction comprises a kinematic viscosity at 50° C. of 100 cSt or more, and a sulfur content of 50 wppm to 150 wppm.

22. The method of claim 18, wherein the hydrotreated resid-containing fraction comprises a sulfur content of 5.0 wppm or less, or wherein the hydrotreated resid-containing fraction comprises a nitrogen content is 5.0 wppm or less, or a combination thereof.

23. The method of claim 18, further comprising blending the hydrotreated resid-containing fraction with a distillate fraction, resid fraction, or combination thereof to form a blended fuel or fuel blending component,
  wherein the blended fuel or fuel blending component comprises 1.0 vol % to 80 vol % of the distillate fraction, resid fraction, or combination thereof, and 20 vol % to 99 vol % of a hydrotreated resid-containing fraction.

24. The method of claim 23, wherein the distillate fraction, resid fraction, or combination thereof comprises a renewable fraction.

25. The method of claim 24, wherein the renewable fraction comprises a hydrotreated vegetable oil, a biodiesel, a fatty acid methyl ester, or a combination thereof.

* * * * *